United States Patent [19]

De Coene

[11] Patent Number: 4,627,226
[45] Date of Patent: Dec. 9, 1986

[54] CROP GATHERING ATTACHMENT FOR CROP HARVESTING MACHINE

[75] Inventor: Frans J. G. C. De Coene, Zedelgem, Belgium

[73] Assignee: New Holland Inc., New Holland, Pa.

[21] Appl. No.: 694,197

[22] Filed: Jan. 23, 1985

[30] Foreign Application Priority Data

Feb. 4, 1984 [GB] United Kingdom ............... 8403017

[51] Int. Cl.⁴ .......................................... A01D 41/06
[52] U.S. Cl. ..................................... 56/14.6; 56/364
[58] Field of Search ................... 56/14.5, 14.6, 364, 56/DIG. 9; 130/27 R

[56] References Cited

U.S. PATENT DOCUMENTS

| 2,465,709 | 3/1949 | Cieslak | 56/14.5 |
| 3,926,108 | 12/1975 | Doering | 56/364 |
| 4,297,760 | 11/1981 | Olivari | 56/364 |
| 4,356,687 | 11/1982 | Lesslhumer | 56/364 |
| 4,453,373 | 6/1984 | De Coene | 56/364 |

FOREIGN PATENT DOCUMENTS

| 1086897 | 10/1967 | United Kingdom | 56/364 |
| 2094606 | 9/1982 | United Kingdom | 56/364 |

Primary Examiner—Gene Mancene
Assistant Examiner—David I. Tarnoff
Attorney, Agent, or Firm—Larry W. Miller; Frank A. Seemar; Darrell F. Marquette

[57] ABSTRACT

A crop gathering attachment for a crop harvesting machine having a crop receiving mechanism operable, in use, to receive crop from the ground, a first crop feeder, and a second crop feeder disposed between the crop receiving mechanism and the first feeder, is disclosed wherein the second feeder includes a plurality of closely spaced rotary members fitted with retractable crop conveying elements. The rotary members are rotated in use so that crop material is conveyed thereover by the extended crop conveying elements to the first feeder.

7 Claims, 5 Drawing Figures

CROP GATHERING ATTACHMENT FOR CROP HARVESTING MACHINE

BACKGROUND OF THE INVENTION

This invention relates generally to crop gathering attachments for crop harvesting machines and, more specifically, to a crop conveying mechanism utilized in a crop harvesting header.

It is usual in crop harvesting machines for standing crop to be harvested by first cutting it and then feeding the cut crop to crop processing components such as a threshing and separating mechanism in the case of a combine harvester, or a chopper in the case of a forage harvester, for example. The feeding of the cut crop to the crop processing components needs to be fluent and consistent so as to load those components uniformly and hence maximize the capacity of the machine. In some known machines, a conveying and consolidating mechanism, such as an auger, for feeding the cut crop to the crop processing components are located a relatively short distance behind the cutterbar, which is desirable from the standpoint of positively moving the crop to the processing means immediately after it has been cut, but which gives rise to the problem, in some instances, of crop being acted upon by the feeder means before it is cut and thus being pulled. This particular problem tends to happen when harvesting crop having long stalks (such as rye and rape for example) which is not standing upright due to adverse weather conditions.

Another problem experienced with known machines arises when the crop is wet and/or infested with weeds. With crop in either of these conditions, the problem of achieving a fluent flow continues to exist as there is a tendency for crop to accumulate in a dead spot which inevitably exists between the cutter means and feeder means even if a reel is used to help sweep the crop first to the cutter means and thence to the feeder means.

One solution to this problem is to employ a conveying device between the cutter means and the feeder means. One such device is a draper such as is disclosed in U.S. Pat. No. 4,038,809. Since the draper separates the cutter and the normal feeder means and is itself not as aggressive as the latter, the aforementioned problem of pulling long-stalked crops before they are cut, is avoided. Also, the problem associated with the dead spot in which wet or weed-infested crop tends to accumulate is relieved.

However, the draper is in effect a continuous belt conveyor, usually made of canvas, and it is difficult to provide adequate tracking means without using complicated, and hence expensive, components for the belts. Furthermore, crop material tends to wrap around the ends of the shafts carrying the canvas belt and eventually gets between the belt and the shafts. This, together with inadequate tracking, results in excessive wear taking place relatively quickly, resulting in frequent belt replacement. Accordingly, the draper has not become a universally accepted device.

British Patent Specification No. 2,094,606A discloses a crop gathering attachment for a crop harvesting machine which incorporates some of the advantages of a draper and avoids many of the disadvantages thereof. The disclosed attachment utilizes an additional feeder mechanism disposed between the normal cutterbar and the normal feeder. The additional feeder mechanism includes a plurality of rotary members, each in the form of shaft on which are mounted a plurality of crop conveying elements extending from the shaft in relatively close proximity, each shaft extending transversely of the attachment and being spaced relative to each other so that the crop conveying elements of adjacent rotary members interleave. In use, the rotary members are rotated in the same direction so that they constitue in effect a moving floor operable to transfer crop from the cutterbar generally longitudinally of the attachment to the normal feeder. These crop conveying elements may be in the form of fingers spaced axially of and equiangularly around the associated shaft or in the form of a plurality of disc members or flanges spaced along the shaft.

While this arrangement has been found very satisfactory for most crops and crop conditions, it does not always handle rice and rape seed, for example, in the best possible manner. In the case of rape seed, a comparatively large amount of grain can fall loose as soon as the crop has been cut and the crop conveying disc members or fingers of the arrangement of British Specification No. 2,094,606A do not always convey that grain to the normal feeder means for subsequent processing. In the case of rice, sticky debris and straw may fill up the spaces between the disc members and cause plugging.

SUMMARY OF THE INVENTION

According to the present invention a crop gathering attachment for a crop harvesting machine comprises a crop receiving mechanism operable, in use, to receive crop from the ground, a first crop feeder and a second crop feeder disposed between the crop receiving mechanism and the first feeder such that the second feeder includes a plurality of closely spaced rotary members fitted with retractable crop conveying elements operable to retract and extend upon rotation of the rotary members. In use, the rotary members are rotated so that crop material is conveyed thereover by the extended crop conveying elements to the first feeder.

Preferably, the crop conveying elements are in the form of paddles extending generally parallel to the axis of rotation of the associated rotary member and operable to sweep crop material, including any separated grain, from the crop receiving mechanism (typically in the form of a cutterbar) to the first feeder. In order to avoid presenting the crop material with a steep ramp up which it must flow, the front rotary member, i.e., that closest to the crop receiving mechanism is preferably located such that the axis of rotation is generally at the level of the crop receiving mechanism. Once the crop material has been engaged by the crop conveying elements of the front rotary member, it is positively conveyed, whereby the next and any subsequent rotary members may be at a higher level in order to raise and transport the crop material to the first feeder.

The rotary members may be positioned such that the retractable crop conveying means of one member sweep close to the periphery of the adjacent upstream rotary member, or such that said retractable elements extend into and sweep pockets formed in the periphery of said upstream rotary members. At least the front rotary member may be provided with a floor, preferably dished, therebeneath for collecting loose grain which is then gathered by the crop conveying elements of that rotary member and conveyed to the adjacent rotary member and so on until it reaches the first feeder. Each other rotary member may also have a floor therebeneath which is preferably removable because, for some crops and/or crop conditions, it is better not to have such a floor.

A deflector may be provided to the rear and below the front rotary member, which deflector is operable to deflect any straw or the like, preventing the latter fromm being fed beneath the front rotary member. The deflected straw would be discharged from the machine if no floor is provided beneath the other rotary members. The crop receiving mechanism may also be provided with a deflector to help convey crop material to the second feeder, this deflector having a removable extension which assists in the handling of crop such as rape seed.

BRIEF DESCRIPTION OF THE DRAWINGS

A combine harvester fitted with a crop gathering attachment in accordance with the present invention will now be described in greater detail, by way of example, with reference to the accompanying drawings wherein.

DETAILED DESCRIPTION OF THE PREFERRED EMBODIMENT

Figure 1:
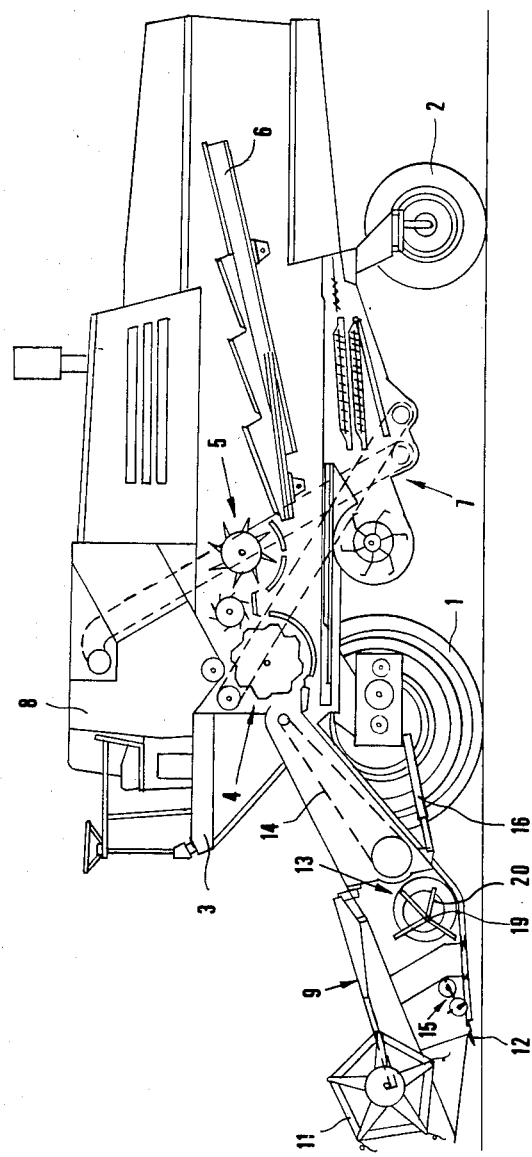
FIG. 1 is a side elevational view of a combine harvester incorporating the principles of the instant invention, portions of the combine being removed for the purpose of clarity.

Throughout this specification by "grain" is meant that part of the crop which is to be harvested, as opposed to that which is discardable and normally referred to as "straw". Any left and right references are used as a matter of convenience and are determined by standing at the rear of the harvester facing the forward end, the direction of travel. Referring now to the drawings and particularly to FIG. 1, a combine harvester of generally conventional form can be seen. The main body is fitted with a pair of front wheels 1, a pair of rear, steerable wheels 2 and has an operator's platform 3. The main body further comprises conventional threshing and separating means 4, separating means 5, straw walkers 6, cleaning means 7 and a grain tank 8. The main body of the combine harvester is provided with a forwardly mounted header 9 incorporating the principles of the present invention.

Still referring to FIG. 1, the header 9 comprises a reel 11, crop receiving means in the form of a reciprocatory cutterbar 12, an auger 13, and an elevator 14 extending between the auger 13 and the threshing and separating means 4, all of which are conventional components. The auger 13 forms a first crop feeder means. Second crop feeder means generally indicated at 15, are provided between the cutterbar 12 and the auger 13. The header 9 is pivotally attached to the main body of the combine harvester and is adjustable relative thereto, in the normal manner by hydraulic actuators 16 disposed one on each side of the machine.

The auger 13 is conventionally constructed with two oppositely wound flights disposed one at each end of a tubular body portion supported for rotation on a tubular shaft 18. Mounted eccentrically with respect to the shaft 18 is a second shaft 19 from which extend tines or fingers 20 which are equiangularly disposed with respect to the auger body portion. The tines 20 extend through slots in the auger body portion and slide relative thereto on rotation of the body portion as is conventional. The shaft 19 and tines 20 are shown in FIG. 1 but not in FIG. 2.

Figure 2:
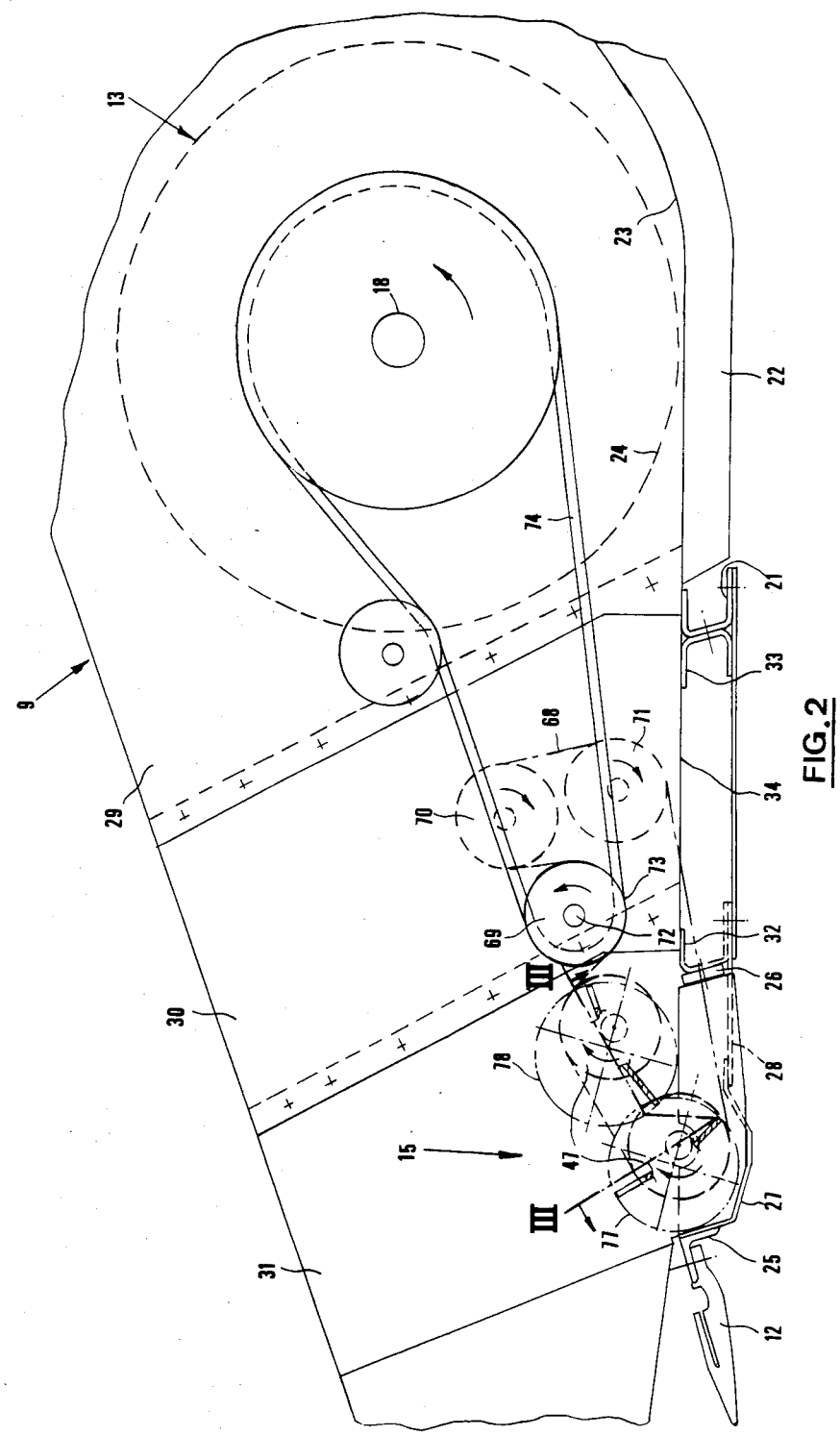
FIG. 2 is an enlarged side elevational view of the crop gathering attachment of FIG. 1.
Figure 3:
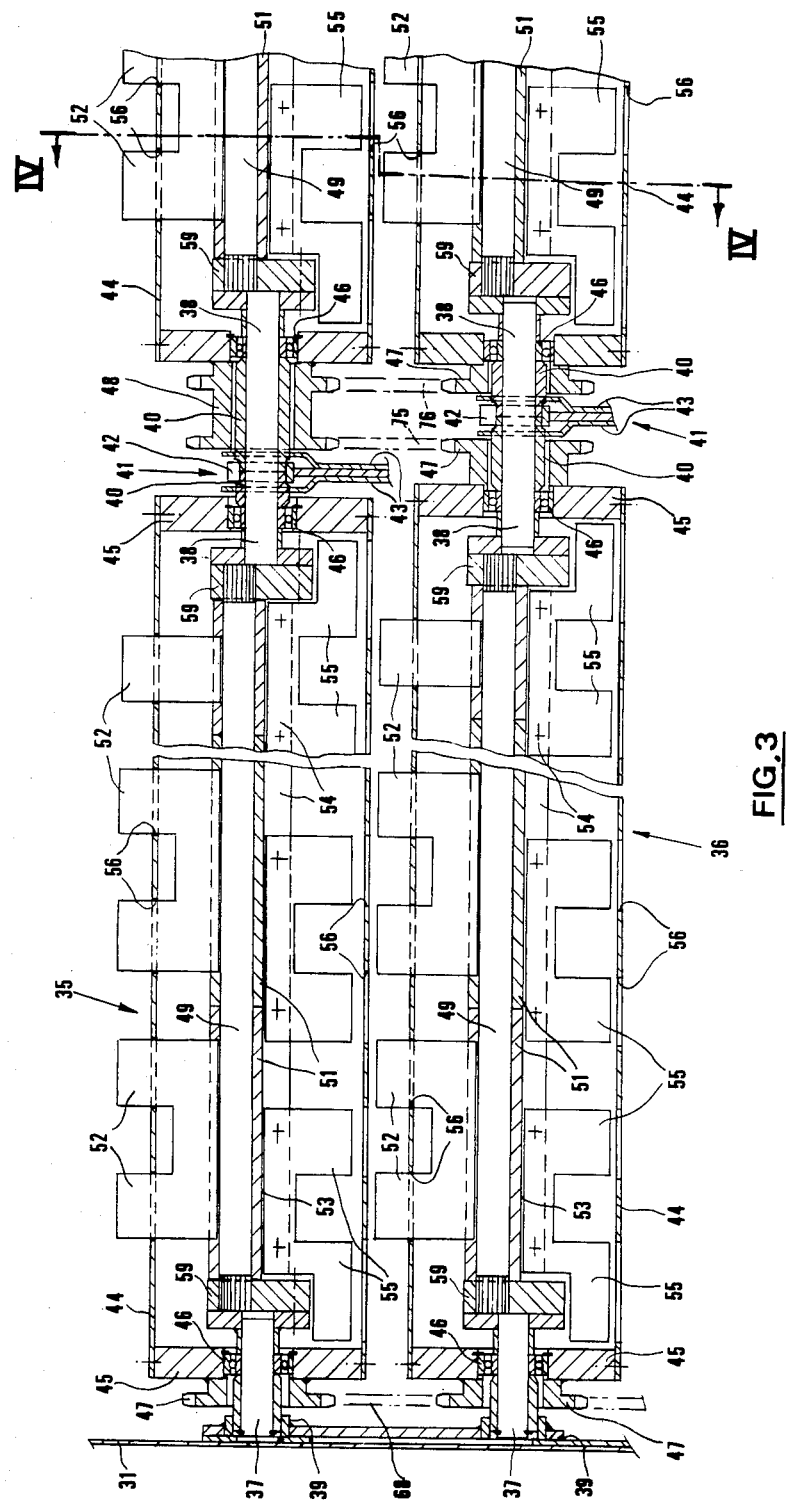
FIG. 3 is a schematical cross-sectional view taken along lines III—III of FIG. 2 with certain portions removed and with other portions shown further apart for the sake of clarity.
Figure 4:
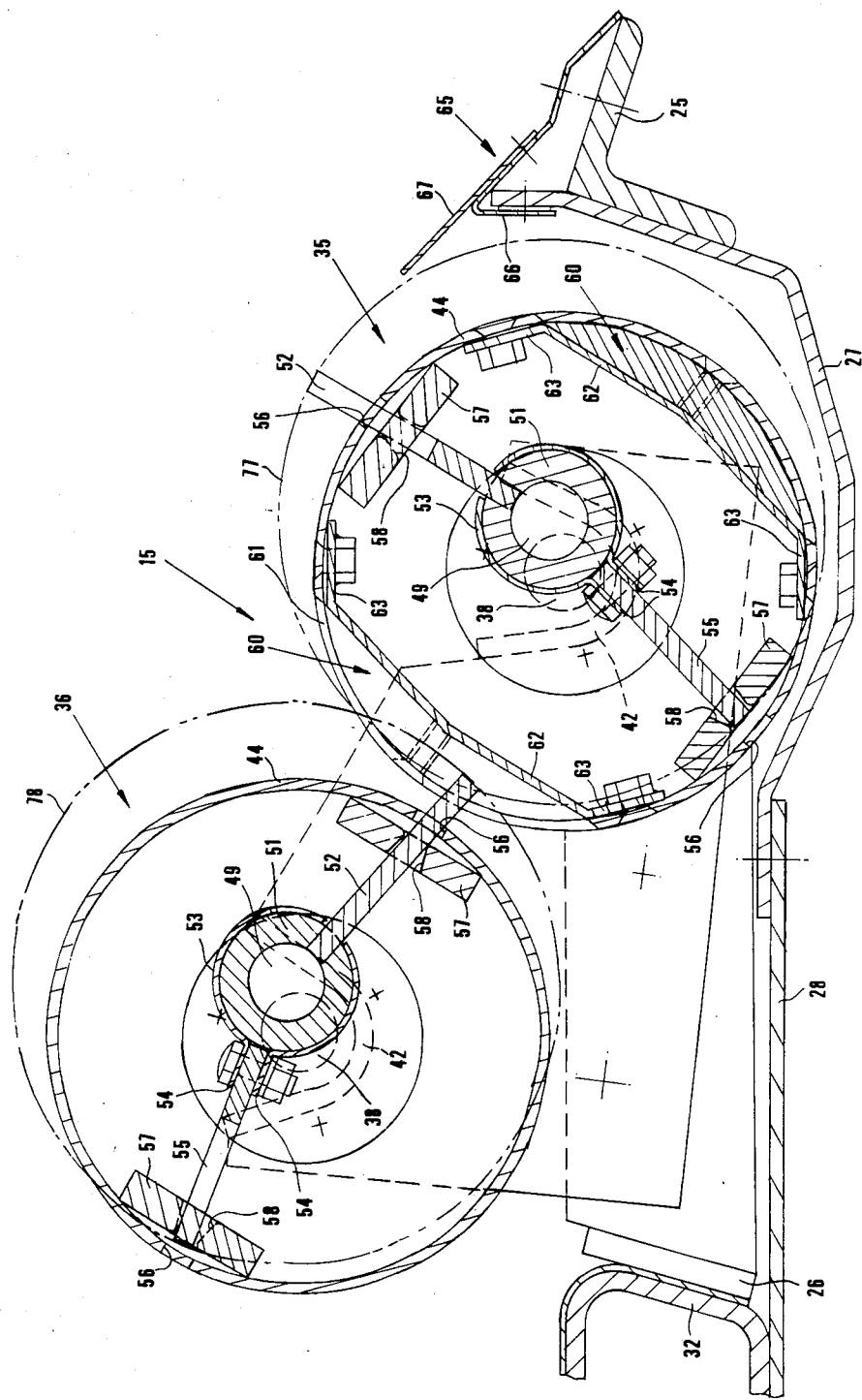
FIG. 4 is an enlarged cross-sectional view taken along lines IV—IV of FIG. 3, with the components being shown in their actual relative position.

Referring now more particularly to FIGS. 2–4, it can be seen that the header 9 is formed in two parts. The rear part comprises a transverse mounting beam 21 and a plurality of longitudinal beams 22 extending rearwardly of the combine harvester from the beam 21. The beams 21 and 22 support a floor portion 23 shaped, as are the beams 22, to conform generally, and be closely spaced with respect to, the path 24 circumscribed by the auger 13. The front part of the header, which is the essence of the present invention and forms a crop gathering attachment, comprises a front transverse beam 25 and a rear transverse beam 26, the latter being detachably connected to the beam 21. The cutterbar 12 is connected to the transverse beam 25 which also supports one end of a floor having a permanent, dished or trough portion 27 and a removable portion 28 which extends between the trough portion 27 and the transverse beam 26.

Two sidewalls 29 extend in the fore-and-aft direction of the header 9 and are attached to the beam 21 and the floor 23. Two further sidewalls 31 extend the length of the second feeder means 15 only and are attached to the respective beams 25,26 and are also secured to respective sidewalls 30 of an intermediate portion of the attachment which further comprises front and rear transverse beams 32 and 33 attached to respective beams 26 and 21 and having a floor 34 spanning the beams 32, 33.

The second feeder means 15 comprises a plurality of rotary means in the form of two transverse rolls 35, 36 which are closely spaced with respect to each other, with the front roll 35 being disposed close to the cutterbar 12 within the trough portion 27. The two rolls 35,36 are generally similar and each is formed in two halves. Each half of each roll 35,36 comprises a pair of stub shafts 37,38, the outermost shaft 37 being journalled in a support 39 attached to the associated sidewall 31, and the innermost shaft 38 being journalled in a support 41. The support 41 common to the two halves of one roll 35,36 comprises a cup or U-shaped support 42 which carries the adjacent ends of the two stub shafts 38, the support 42 being attached at one end on the chassis or frame of the crop gathering attachment. A pair of arms 43 is formed with hexagonal apertures at one end which receive hexagonal collars 40 attached to respective stub shafts. The arms 43 are connectable at the other ends in a number of angular positions to the opposite sides of the associated U-shaped support 42. Thus, angular movement of the arms 43 results in angular adjustment of the stub shafts 38 for a purpose to be described. Also, when the arms 43 are attached to the U-shaped support 42, the stub shafts 38 are firmly held in the U-shaped members of said supports 42.

Each pair of stub shafts 37,38 carries one half of the associated roll which comprises a cylindrical body 44 of sheet metal and two annular ends 45 which are attached to respective bearings 46 on the stub shafts. Basically, each end 45 of each left-hand half roll has, attached thereto a sprocket 47, the only exception to this being the inner end of the left-hand half of the front roll 35 which has no sprocket. The inner end of the right-hand half of the front roll 35 has a double sprocket 48 attached thereto while that the corresponding end of the right-hand half of the rear roll 36 has a single sprocket 47 attached thereto. This arrangement allows the chain drive for the rolls 35, 36 to cross over the central supports 42, 43 of the rolls as will be described.

Each pair of stub shafts 37,38 carries an eccentric shaft 49 around which is disposed a sleeve made up of sections 51 formed with paddles 52, which, in the main, are provided in pairs although single paddles may have to be used according to the length of the rolls. The paddles 52 extend radially of the eccentric shaft and are composed of a synthetic plastics material, as are the sleeve sections 51. A split sleeve 53 is disposed over the sleeve sections 51 so as to be angularly movable relative thereto, slots being provided for the through-passage of the paddles 52 and dimensioned such as to allow said relative angular displacement. The edges at the split of the sleeve 53 are turned outwardly to form a pair of opposed flanges 54 between which are bolted further pairs of synthetic plastic paddles 55. The paddles 55 are generally diagonally opposed to the paddles 52 although not always precisely so in view of the relative angular displacement which needs to take place between the sleeves 51 and 53.

Each paddles 52 and 55 extends parallel to the axis of rotation of the related roll 35,36 and is associated with a slot 56 in the periphery of the associated roll body 44, through which slot it is guided by a guide member 57 having a flared slot 58 to accommodate movement of the paddle as it extends and retracts relative to the periphery of the associated roll due to the eccentricity of the associated shaft 49 relative to the longitudinal axis of the related roll 35,36. It will be noted that the paddles 55 adjacent the ends of the roll halves are extended in width but cut away to accommodate mountings 59 for the eccentric shafts 49 on the stub shafts 37,38.

Referring more specifically to FIG. 4, the front roll 35 is formed with a plurality of recesses or pockets 60 formed by periphery openings 61 in the bodies 44 of the two halves of the roll in which are inserted generally U-shaped members 62 having flanges 63 by which they are attached to the roll bodies. The base of each pocket 60 is raised in the center so as to extend outwardly of the roll and the pockets are arranged so that the paddles 52 and 55 of the other roll 36 extend thereinto as they move outwardly of the roll as they approach the front roll. It will be seen that the pockets 60 are arranged in two diametrically opposed rows extending parallel to the axis of rotation of the roll 35.

A deflector 64 is removably mounted at the lower rear of the front roll 35, (shown only in FIG. 5) and a further deflector or guide 65 mounted on the beam 25. The guide 65 is in two parts: a generally inverted U-shaped part 66 and a removable, generally linear part 67 which overlies one limb of the part 66. The part 67 is particularly useful when harvesting rape seed is not only provided a transition surface between the cutterbar 12 and the front roll 35 but also helping to guide, by virtue of its surface facing the front roll 35, any grain which is being swept by the paddles 52 and 55 of the front roll from the trough portion 27 into the incoming layer of crop material.

FIG. 2 shows the diagrammatic form the drive arrangement for the rolls 35 and 36 which are driven from the left-hand end (as seen in FIG. 2) by a chain 68 which engages the sprockets 47 on the adjacent ends of the two rolls to rotate the latter in the same direction which is such as to convey crop material thereover. The chain 68 also engages three reversing sprockets 69,70,71 the first of which is carried by an intermediate shaft 72 which also carries a pulley 73 which is driven by a belt 74 from the auger 13. Thus the ends of one half of each roll 35,36 are driven and the other halves are driven by a chain 75 which engages one sprocket of the double sprocket 48 at the center of the roll 35 and the sprocket 47 on the left-hand half of roll 36 as seen in FIG. 4. Another chain 76 engages the second sprocket on the double sprocket 48 and the sprocket 47 on the right-hand half of roll 36, this intermediate drive arrangement being arranged so as to cross over the intermediate central supports 42,43 for the rolls 35,36 as already mentioned.

It will be seen from FIG. 4 that the paths 77 and 78 described by the tops of the paddles 52,55 of the respective rolls 35 and 36 overlap between the rolls due to the provision of the pockets 60, the two rolls thus having to be timed with respect to each other. The paths 77 and 78 can be angularly adjusted relative to each other by adjusting one or both pairs of arms 43, which movement rotates the associated hexagonal collars 40 and hence the related stub shafts and eccentric shafts 49. This angular displacement of the eccentric shafts 49 about the axis of the respective rolls 35,36 varies the position of maximum extension of the paddles 52 and 55. However, this adjustment possibility is not essential to the invention and may be left out in a simplified embodiment by providing fixedly positioned eccentric shafts 49.

Figure 5:
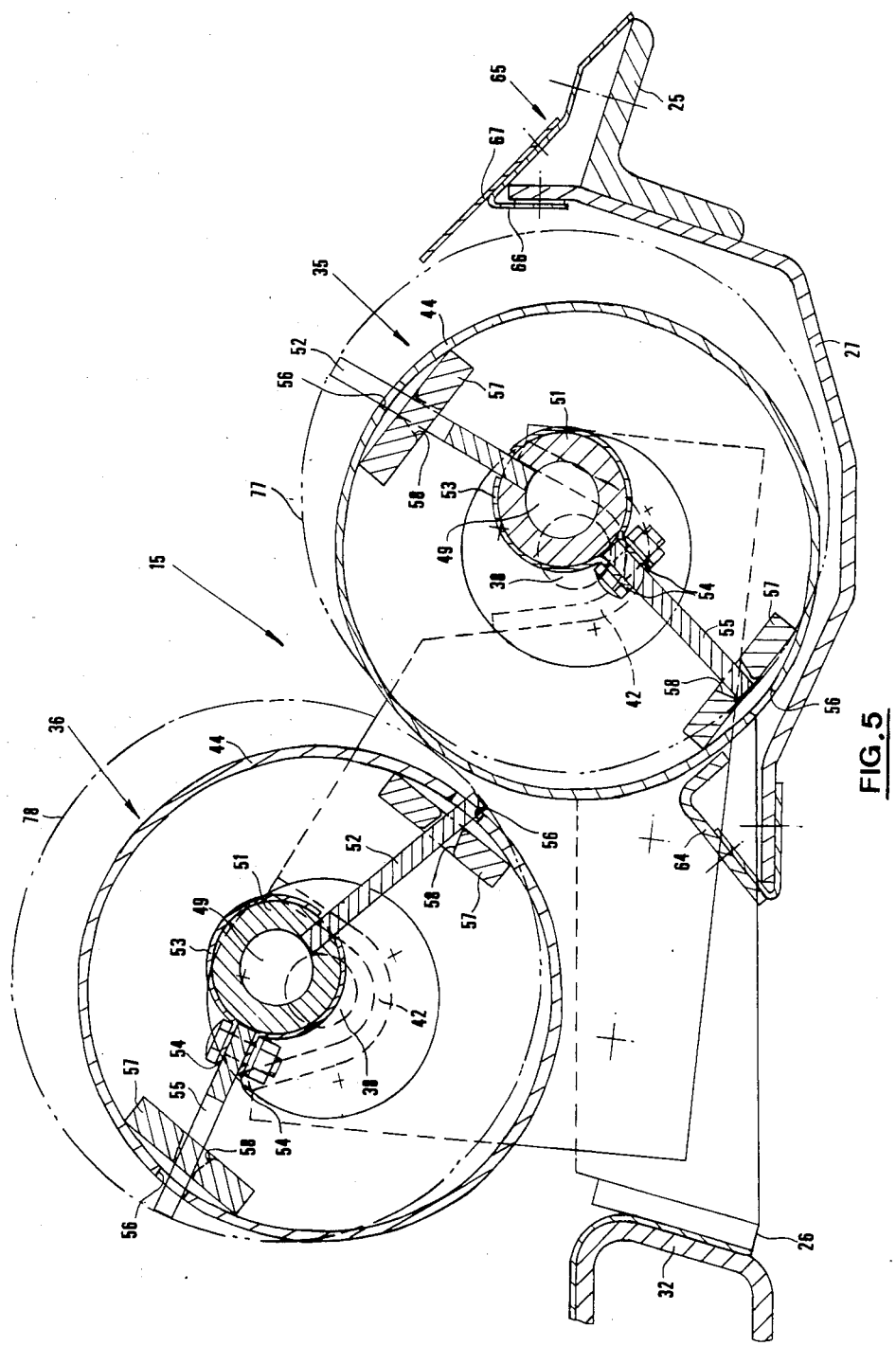
FIG. 5 is a view similar to that of FIG. 4 but showing a different embodiment of the rotary members forming the second feeder means.

FIG. 5 shows the path 78 of the roll 36 in an adjusted position relative to that shown in FIG. 4, this path being more to the left so that the tips of the paddles 52 and 55 of the roll 36 just sweep the outer periphery of the front roll 35 which, in this modified arrangement, is not formed with pockets 60. The absence of these pockets has been found not to detract from the crop feeding characteristics of the rolls 35 and 36. FIG. 5 also shows the crop gathering attachment in use without the floor 28 but with the deflector 64 which serves to deflect debris through the opening resulting from the absence of the floor, thereby preventing that material from entering the trough 27.

Assuming rape seed is to be handled by the combine harvester, then the crop gathering attachment is set up as shown in FIG. 4 of the drawings, that is with the floor 28 in position and the deflector 64 removed. The crop material is cut by the cutterbar 12 and the forward movement of the machine together with the conveying action of the reel 11 effectively pushes the cut material up the guide portion 67 at the top of which the extended paddles 52 and 55 of the front roll 35 grasp the material and convey it over the front roll 35 to the rear roll 36 where the paddles 52 and 55 of that roll take over the transport of the material over the roll 36 to the auger 13, starting with any grain which might be located in the pockets 60 into which the paddles 52, 55 of the roll 36 extend. Once the cut crop material has reached the auger 13 assisted by the header reel 11, it is processed in the normal way.

The close spacing of the rolls 35, 36 prevents any undue amount of crop material or separated grain (prevalent in rape seed at this stage of the harvesting process) falling therebetween but any which does find its way between the rolls or to the rear of the roll 36 falls to the trough 27 from which it is swept by the paddles 52,55 of the roll 35 as they start to extend following the retraction thereof as they approach the roll 36. Any grain falling on the floor 28 is shaken (due to machine vibration) to the trough 27. Any grain falling on the floor 34 of the intermediate portion of the attachment as well as on the floor 23 of the header trough will not be shaken to the trough 27 but since the crop material leaving the roll 36 moves downwardly to the intake of the auger 13, then it moves over these portions of the floor and tends to sweep any grain thereon into the auger.

The intermediate portion of the attachment is provided in order to accommodate tall crops such as rape seed which might otherwise be grasped by the auger 13 before being cut. Practice has shown that there is no need to provide any crop conveying means in the intermediate portion for harvesting tall crops, the initial movement being induced by the crop conveyor means 15 of the forward attachment and by the reel 11 to the crop material being sufficient for the crop material to bridge the gap between the rear roll 36 and the auger intake.

When handling normal crops, the attachment may be modified by removing the intermediate portion, whereby the rear roll 36 is positioned fairly close to the auger intake, thus avoiding any "dead spot" of substantial size at the transition between the cutterbar and the auger intake. This is particularly useful when harvesting weed infested crops or wet crops such as rice. For crops in which the grain is not readily shaken loose, e.g., rice, the floor 28 will be removed and the deflector 64 inserted. Thus any dirt, grass, weeds or the like falling below the rolls 35,36 will be discharged from the machine and prevented from reaching the trough 27 and thus being swept back into the newly cut crop material. This discharge of debris helps prevent plugging of the machine but, of course, must be retained and returned to the incoming crop material when it contains valuable grain as in the cases of rape seed.

The paddles 52,55 have been found to effect very positive conveyance of the crop material from the cutterbar 12 to the auger 13, including the conveyance of any grain which falls to the trough 27 when the floor 28 is employed, the inner surface of the guide 67 serving to prevent the paddles throwing the grain taken from the trough out of the machine, while the upper surface guides the incoming cut crop material. The guide 67 may be dispensed with when handling crop material from which the grain does not readily shake loose.

It will be appreciated that the paddles 52,55 are extended and retracted relative to the roll body portions 44 as the latter are driven around the stub shafts 37,38 (which remains stationary) and hence around the eccentric shafts 49 carried by the respective pairs of stub shafts. This action entails relative rotational movement between the two sets of paddles 52,55 on a given eccentric shaft 49 which is accommodated by the split sleeve 53 being able to rotate with respect to the sleeve portions 51.

The crop gathering attachment of the present invention can be fitted to any existing harvesting machine by mounting the beam 33 of the attachment on the beam 21 of the harvesting machine on which is normally mounted the cutterbar 12 or other crop receiving means. Therefore, when the attachment is not required, the machine can revert to its normal construction by removing the attachment and mounting the cutterbar on the beam 21. The invention is particularly useful when harvesting rice and rape seed but also may be used to advantage with other crops.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the followig claims are intended to protect the invention broadly as well as in the specific form shown.

Having thus described the invention, what is claimed is:

1. A crop gathering attachment for a crop harvesting machine having crop receiving means capable to receive crop from the ground, first crop feeder means, and second crop feeder means disposed between the crop-receiving means and the first feeder means, an improved said second feeder means comprising:

a plurality of longitudinally spaced rotatable members mounted for rotation about a transverse axis, each said rotatble member having retractable crop conveying means operable to retract and extend relative to said rotatable member upon rotation thereof;

drive means for rotating said rotatable members so that the respective said retractable crop conveying means operatively cooperate with adjacent crop conveying means to convey crop rearwardly from one rotatable member to the other until said crop is delivered to said first feeder means; and a transversely extending removable section disposed between said first and second feeder means to permit a changing of the longitudinal distance between said first and second feeder means.

2. The crop gathering attachment of claim 1 wherein said crop conveying means comprise a first set of paddles extending radially and axially of shafts mounted eccentrically within each respective rotatable member and a second set of paddles extending radially and axially of the corresonding said eccentric shaft and generally diametrically opposite to the associated first set of paddles, each said set of paddles being mounted for extendion and retraction through a corresponding aperture in said corresponding rotatable member and extending along substantially the entire transverse width of said rotatable members.

3. The crop gathering attachment of claim 2 wherein said eccentric shafts are angularly adjustable around the respective axes of rotation of the rotatable members to effect adjustment of the path of travel described by the tips of the paddles.

4. The crop gathering attachment of claim 2 further comprising a floor disposed beneath said second feeder means, said floor having a first floor portion positioned beneath the rotatable member positioned closest to said crop receiving means, the shape of said first floor portion generally conforming to the path described by the tips of the corresponding paddles to permit grain falling from said crop through said second conveying means to said first floor portion to be engaged by said corresponding paddles and swept back into the flow of crop being fed rearwardly to said first feeder means.

5. The crop gathering attachment of claim 4 wherein said removable section comprises a second floor portion forming a part of said floor positioned beneath the remaining rotatable members, said second floor portion being removable from said crop gathering attachment.

6. The crop gathering attachment of claim 5 further comprising crop deflecting means mounted adjacent said first floor portion to deflect debris through an opening in said floor formed by the removal of said second floor portion, thereby preventing said debris from reaching said first floor portion.

7. The crop gathering attachment of claim 4 wherein the axis of rotation of said rotatable member positioned closest to said crop receiving means is generally at the same level as said crop receiving means.

* * * * *